United States Patent Office 3,180,548
Patented Apr. 27, 1965

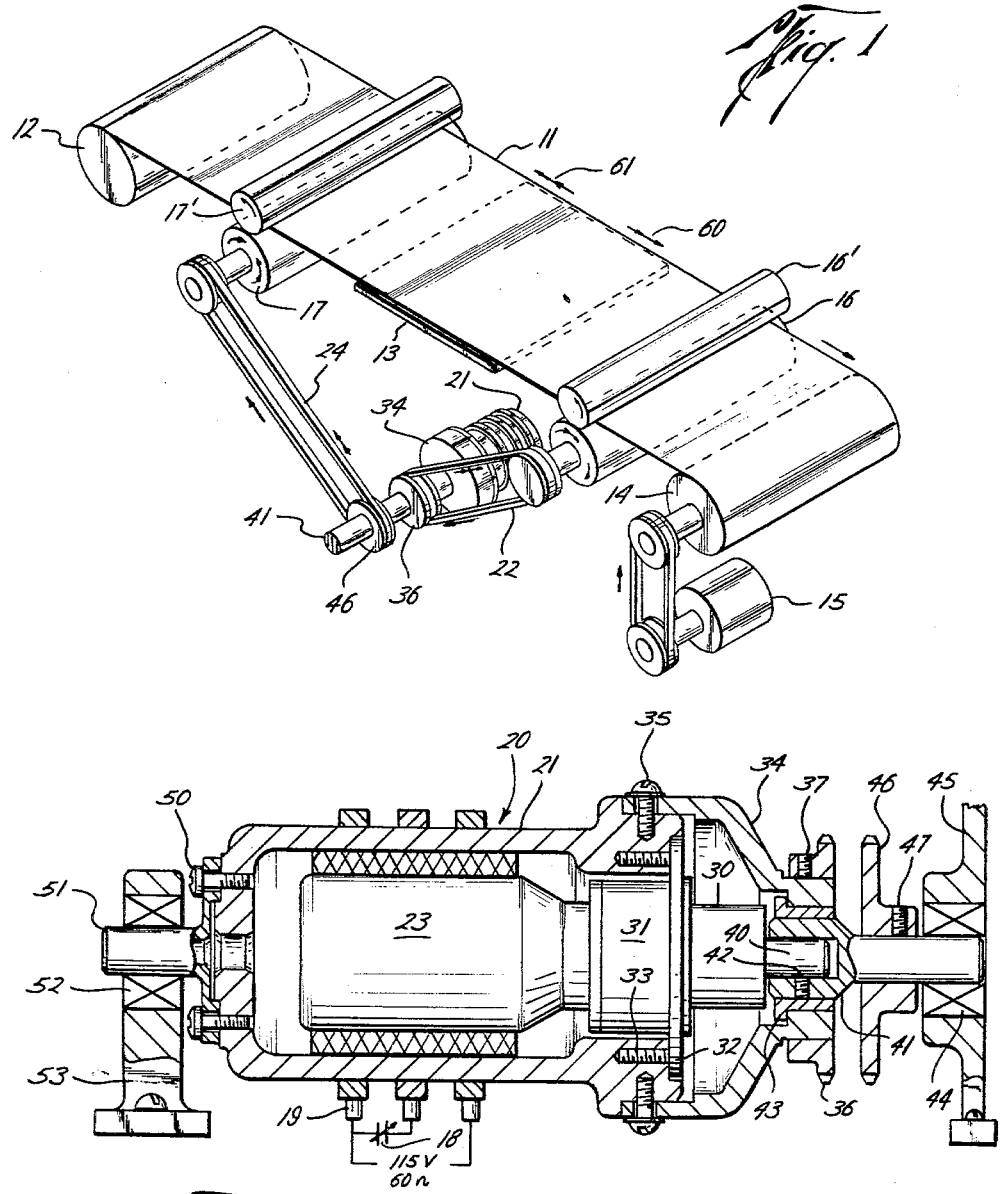

3,180,548
FILM TENSIONING APPARATUS
John A. Stafford, Houston, Tex., assignor to Schlumberger Well Surveying Corporation, Houston, Tex., a corporation of Texas
Filed Oct. 23, 1962, Ser. No. 232,500
1 Claim. (Cl. 226—195)

This invention relates to galvanometric recording systems and more particularly to an apparatus for maintaining substantially constant the tension on the films used in such recording systems.

In a galvanometric recorder for use in conjunction with a borehole instrument traversing earth formations, it is often necessary to maintain a substantially constant tension on the films employed to record the galvanometer's displacements. In such recorders, the means used to drive the films are mechanically coupled for synchronous movement with a depth measuring wheel. The depth measuring wheel must be relatively free to rotate. Hence the torque obtainable from it is limited.

Accordingly, it is a broad object of this invention to provide, in a galvanometric recorder for use in conjunction with a borehole instrument traversing earth formations, means for maintaining substantially constant the film's tension without burdening the film's driving means.

This and other apparent objects of this invention are accomplished by employing at least two drive rollers engaging the film at spaced positions and freely rotating in the same direction in synchronism with the movement of the borehole instrument. To tension the film there is provided a tensioning motor comprising a freely rotating stator and a freely rotating rotor, the stator being coupled for rotation with one of the rollers and the rotor being coupled for rotation with the other of the rollers. When the motor is energized, its stator and rotor tend to rotate in opposite directions. Consequently, the motor's stalling torque provides equal and opposite torques to the drive rollers thereby tensioning the film without loading down the film's driving means.

The invention will be better understood from the following detailed description when taken in conjunction with the accompanying drawings in which:

FIGURE 1 is a schematic, isometric view of the preferred tensioning apparatus in accordance with the invention; and FIGURE 2 is a view, partly in section, of the tensioning motor shown in FIGURE 1.

Referring to the drawings, the galvanometric recorders such as are employed, for example, in conjunction with borehole instruments traversing earth formations, one or more films 11 are being displaced at the same or different speeds for recording the deviations of the image beams reflected by the galvanometer's mirrors (not shown). The recorded graphs on the films represent the variations as a function of depth of the amplitudes of the measured conditions. It will be apparent that without substantially constant tension, film 11 may bunch resulting in erroneous graphs.

In a typical embodiment, film 11 is unrolled from a supply reel 12 and is curved slightly to pass over a backing plate 13 before being rolled unto a receiving reel 14. The film may be driven in any conventional manner as by coupling the depth measuring wheel 15 to the shaft of reel 14. The film is passed between two sets of rollers 16, 16′ and 17, 17′. A suitable pressure is maintained between each set of rollers. Obviously, the film could also be driven by applying the driving torque, for example, to roller 16 instead of to reel 14.

It is desired to tension film 11 over the backing plate 13 without burdening the film's driving source 15: overloading the depth measuring wheel might reduce its slippage capacity along the wall of the borehole and hence cause appreciable measurement errors.

This is accomplished by providing a tensioning motor, generally designated as 20, which may be of the single-phase hysteresis type, operating split phase by means of a starting capacitor 18, and being energized through slip rings 19 from a 115-volt, 60-cycles outlet. Motor 20 includes a stator 21 connected by a sprocket chain 22 to roller 16 and a rotor 23 connected to roller 17 by a sprocket chain 24. The rotor's shaft 30 is journalled in a bearing 31 which is carried by a plate 32 fixedly secured to the end of stator 21 by screws 33. A bell-shaped member 34 is secured to stator 21 by bolts 35. A stator sprocket 36 is fixed to the outermost portion of member 34 by a setscrew 37 for engagement with chain 22. The rotor's shaft 30 has a reduced end section 40 which is received by the cup-shaped end of an extension shaft 41. A setscrew 42 rigidly couples shaft 40 and one end of shaft 41 for corotation within a bearing 43 carried by member 34. The other end of shaft 41 is rotatably mounted within self-aligning bearings 44, carried on a stationary support 45. A rotor sprocket 46, engaging the chain 24, is fixedly secured to shaft 41 by a setscrew 47. To the other end of stator 21 is secured by bolts 50 a hollow shaft 51. Shaft 51 freely rotates within bearing 52 mounted within a stationary base post 53.

In the operation of the film tensioning apparatus, reel 14 is driven in synchronism with the depth measuring wheel 15. As a result, chains 22 and 24 travel in directions indicated by the single-headed arrows. When motor 20 is energized, its stator 21 and rotor 23 tend to rotate in opposite directions. Hence, chains 22 and 24 also tend to travel in opposite directions, as indicated by the double-headed arrows 60, 61. Consequently, the stalling torque of motor 20 provides the desired tension on film 11 without interferring with the rotation of rollers 16, 16′ and 17, 17′ in their original directions (single-headed arrows). Stator 21 and rotor 23, although being subjected to the stalling torque, also freely rotate within their respective bearing mountings 52 and 44. The stalling torque, and therefore the film tension, may be adjusted by varying the value of the starting, phase-shifting capacitor 18. Because the forces (see arrows 60, 61) pulling on film 11 are equal and opposite, no burden is added to the film's driving means 15.

Although an exemplary embodiment of the invention has been illustrated, the invention is not limited thereto. Accordingly, the accompanying claim is intended to include all equivalent arrangements falling within the scope of the invention.

What is claimed is:

A film tensioning apparatus comprising in combination:
a film, at least two drive rollers engaging said film at spaced positions along the path of said film,
a tensioning motor having a freely rotating stator and a freely rotating rotor,
at least two pressure rollers, one of said pressure rollers being placed opposite to and in parallel spaced relation with one of said drive rollers and the other of said pressure rollers being placed opposite to and in parallel spaced relation with the other of said drive rollers whereby said film passes between each pair of pressure and drive rollers,
means connecting one of said drive rollers to said stator and the other of said drive rollers to said rotor,
means coupled to said film for displacing said film in a predetermined direction whereby the pressure and drive rollers in each pair of rollers become rotatable by the moving film in opposite directions, and when said tensioning motor is energized said stator and said rotor tend to rotate said drive rollers in directions opposite to the directions imparted by the moving film thereby causing the portion of the film between the pairs of rollers to be under tension.

References Cited by the Examiner

UNITED STATES PATENTS

| | | | |
|---|---|---|---|
| 1,718,355 | 6/29 | Hutchison | 242—75.51 |
| 2,013,109 | 9/35 | Reynolds | 226—181 |
| 2,507,351 | 5/50 | Scherbatskoy | 33—205.52 X |
| 2,679,161 | 5/54 | Yancey | 73—151.5 |
| 2,732,060 | 1/56 | Zaveruha | 226—181 |

ROBERT B. REEVES, *Primary Examiner.*

WILLIAM B. LA BORDE, SAMUEL F. COLEMAN,
*Examiners.*